United States Patent [19]

Yano et al.

[11] 4,142,479

[45] Mar. 6, 1979

[54] MAGNETIC SEPARATORS AND APPARATUS FOR MAKING THE SAME

[75] Inventors: Junichi Yano, Tokai; Isamu Eguchi, Nagoya, both of Japan

[73] Assignee: Daidotokushuko Kabushikikaisha, Nagoya, Japan

[21] Appl. No.: 729,917

[22] Filed: Oct. 5, 1976

[30] Foreign Application Priority Data

Oct. 6, 1975 [JP] Japan ................................ 50/120445

[51] Int. Cl.$^2$ ............................................... B05C 5/02
[52] U.S. Cl. ............................. 118/623; 118/308; 210/222
[58] Field of Search ............... 210/222; 209/219–223; 29/163.5; 55/209; 118/623; 427/47

[56] References Cited

U.S. PATENT DOCUMENTS

| | | | |
|---|---|---|---|
| 2,329,893 | 9/1943 | Girard | 209/223 |
| 3,328,192 | 6/1967 | Soyles | 427/47 |
| 3,375,925 | 4/1968 | Carpenter | 210/222 |
| 3,539,509 | 11/1970 | Herrman et al. | 210/222 |
| 3,567,026 | 3/1971 | Kolm | 210/222 |
| 3,581,898 | 6/1971 | Tyrell | 210/222 |
| 3,676,253 | 7/1972 | Cox | 427/47 |
| 3,892,908 | 7/1975 | Louness | 427/47 |

FOREIGN PATENT DOCUMENTS

| | | | |
|---|---|---|---|
| 58797 | 6/1890 | Fed. Rep. of Germany | 210/222 |
| 226922 | 5/1943 | Fed. Rep. of Germany | 210/222 |
| 252034 | 5/1926 | United Kingdom | 209/222 |

Primary Examiner—Theodore A. Granger
Attorney, Agent, or Firm—William Anthony Drucker

[57] ABSTRACT

Disclosed is a novel and improved magnetic separator or filter, as well as an apparatus for making such a magnetic separator. Each filter cell comprises a base plate and a plurality of fibrous filter elements made of magnetizable material and secured to the base plate. The filter elements extend in a mutually parallel spaced relation and substantially perpendicularly to the direction of flow of the fluid and to the plane of the magnetic field.

3 Claims, 6 Drawing Figures

MAGNETIC SEPARATORS AND APPARATUS FOR MAKING THE SAME

This invention relates to the separation or filtration of magnetic particles from a fluid. More specifically, this invention is concerned with a magnetic separator or filter and apparatus for making the same.

Filtration of a fluid containing magnetic particles is conventionally carried out by a fine-mesh net or sieve placed across a path of the fluid, so that as the fluid passes through the net, the magnetic particles are separated therefrom. The conventional separator employing such a net is, however, unsatisfactory in various respects. There are unaviodably certain limitations to the fineness of the mesh openings of such a net in order to ensure that the net does not present a great resistance to the flow of a fluid therethrough. On the other hand, if the mesh openings are too coarse, very fine particles in the fluid may easily pass through the net and the net provides only a very poor efficiency of filtration. When the mesh openings are clogged with particles, it is necessary to remove those particles by passing water through the net in a direction reverse to that of flow of the fluid to be treated. As a matter of fact, removal of particles from the net requires a process having a number of steps. Firstly, the flow of the fluid being treated through the device must be interrupted and then, the fluid passage must be changed to admit the washing water. Then, washing water is supplied to flow through the device in a direction opposite to that of flow of the fluid to be treated. After the particles are removed from the net, the fluid passage must be returned to its original position and a fluid containing magnetic particles is again caused to flow through the device. These steps are generally very troublesome and time-consuming.

It is, therefore, an object of this invention to provide a novel and improved magnetic separator which can effectively separate very fine magnetic particles from a fluid passing therethrough and permits easy removal of the separated particles from filter members.

It is another object of this invention to provide a novel and improved method of making such a magnetic separator.

It is a further object of this invention to provide a novel and improved apparatus for making such a magnetic separator.

The magnetic separator of this invention comprises a multiplicity of fibrous filter elements made of magnetizable material and placed together in a mutually spaced and uniformly distributed pattern. The filter elements extend in a direction substantially perpendicular to the plane across which a magentic field is developed when the device is in use, so that the filter elements are magnetizable with lines of magnetic force running at right angles to the axes of the individual elements. The fluid to be treated is caused to flow in a direction substantially perpendicular to the axes of the filter elements and pass through that area within the device in which the magnetic force is centered, so that the filter elements can most effectively attract the magnetic particles away from the fluid.

Moreover, in view of the fact that according to this invention, the filter elements are magnetized within the fluid flowing therepast by magnets located outside of the passageway of the fluid, it is sufficient to demagnetize the filter elements and pass a washing liquid therethrough in order to remove the collected particles from the filter elements. Therefore, the filter elements can easily be regenerated for fresh use without causing any substantial loss of time or operating efficiency.

The filter elements employed in the device of this invention can very economically be used over a long period of time repeatedly, because the mere magnetization and demagnetization of the filter elements readily permit them to attract magnetic particles from a fluid and release them for regeneration, respectively. Further, as the filter elements are supported in a plurality of cells in a casing, it is sufficient, if a particular filter cell is damaged, to change it to a new one, so that the device of this invention does not involve any complicated problem in maintenance and repair.

According to the method of this invention, each filter cell is made by placing a base plate for the cell in an area of a magnetic field and supplying a multiplicity of fibrous filter elements into that area of the magnetic field in which a smaller magnetic force prevails than in the area in which the base plate is placed, whereby the filter elements are magnetically attracted to the base plate. As they are attracted toward the base plate, the filter elements are all directed in parallel to one another and to the plane of the magnetic field, so that the filter elements are secured to the base plate in an orderly and uniformly distributed pattern. Accordingly, the method of this invention provides a simple and inexpensive means for making separators of very high and uniform quality.

These and other objects and features of this invention will become apparent from the following description and the accompanying drawings, in which.

Figure 1:
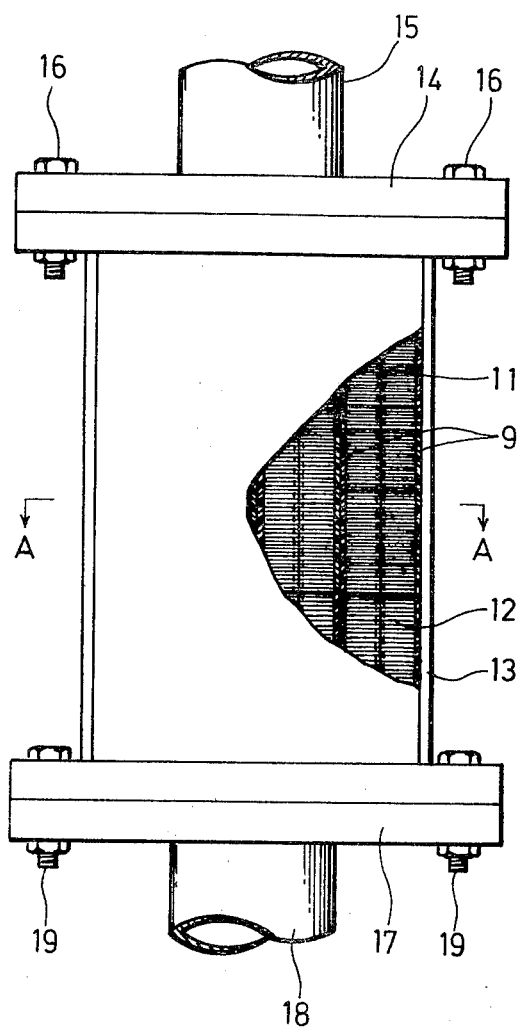
FIG. 1 is a side elevational view partly in section of a magnetic separator embodying this invention.
Figure 2:
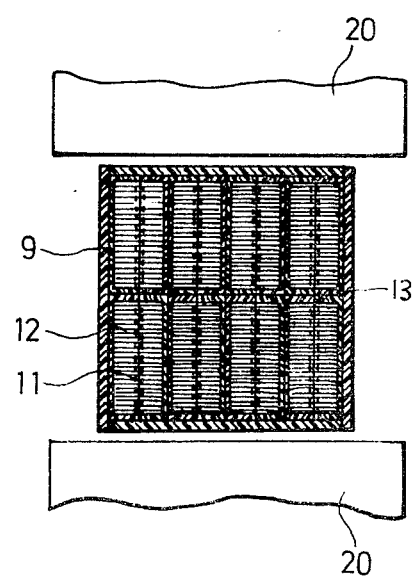
FIG. 2 is a fragmentary top plan view of the device shown in FIG. 1.
Figure 3:
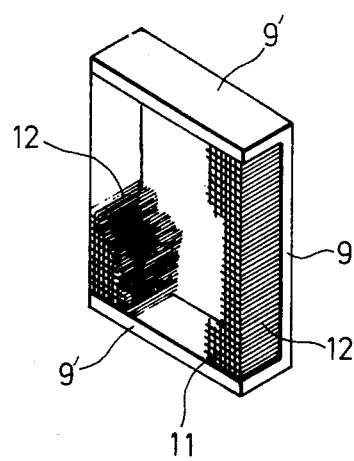
FIG. 3 is an enlarged perspective view of one of filter cells employed in the device of FIGS. 1 and 2.
Figure 4:
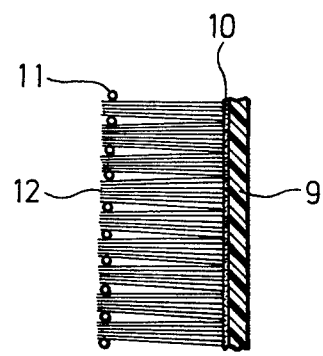
FIG. 4 is a fragmentary enlarged view in section of the filter cell shown in FIG. 3.

Referring now to the drawings more particularly, in which like numerals are used to indicate like parts throughout the several views, and specifically to FIGS. 1 and 2 thereof, there is shown a magnetic separator embodying this invention which comprises a vertically disposed casing 13 made of non-magnetic material and having a generally square cross section. The casing 13 is vertically disposed and open at its upper and lower ends. A pair of magnets 20 are suitably supported adjacent to a pair of opposite side walls of the casing 13 as shown in FIG. 2. An end plate 14 is secured to the upper end of the casing 13 by bolts 16 and another end plate 17 is likewise bolted to the lower end of the casing 13 at 19. An inlet conduit 15 is connected to the upper end plate 14 and an outlet conduit 18 is connected to the lower end plate 17. The casing 13 houses a plurality of filter cells, one of which is shown in FIGS. 3 and 4. As shown in FIGS. 3 and 4, each filter cell or unit comprises a base plate 9 and a pair of side plates 9' extending integrally from the opposite side edges of the base plate 9 at right angles thereto. The base plate 9 and the side plates 9' may be made of aluminum. The base plate 9 may also be made of any other appropriate non-magnetic solid material than aluminum. Alternatively, the filter cell may be formed from a plate of any other material covered with a substantially non-magnetic material. A wire netting 11 is fastened to the free edges of the side plates 9'. The wire netting 11 extends in parallel to the base plate 9 and is spaced therefrom by a distance of 5 mm. The filter cell holds therein a multiplicity of magnetic fiber elements each having one end secured to the inner surface of the base plate 9 by an adhesive 10. The other end of each magnetic filter element 12 extends slightly outwardly through the wire netting 11 as shown in FIG. 4 and is held within one of the meshes of the wire netting 11 against substantial lateral displacement. Each filter element 12 is made of ferritic stainless steel and has a length of approximately 6 mm. The filter element 12 may have a thickness ranging from 10 to 100 microns. The filter cells are arranged in a plurality of pairs at three levels one upon another within the casing 13 as shown in FIG. 1. At each level, the casing 13 accommodates eight pairs of filter cells as shown in FIG. 2. Each pair of filter cells are disposed with the free ends of the side plates 9' abutting each other to thereby form a laterally closed rectangular configuration as shown in FIG. 2. As is apparent from FIG. 2, the base and side plates 9 and 9' of each filter cell are disposed vertically to permit a fluid to flow down through the filter cell. The filter elements 12 are disposed very close to one another to thereby permit any portion of the fluid flowing into the device to effectively contact the filter elements 12.

Figure 5:
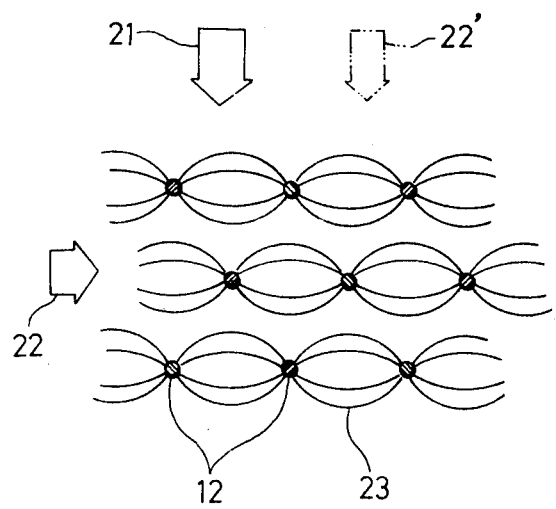
FIG. 5 is an enlarged schematic view illustrating the principle of operation of the device according to this invention.

The magnets 20 are connected to energizing coils not shown and energized upon application of an electric current to those coils. The magnets 20 are positioned on the opposite sides of the casing 13 in the arrangement of FIG. 2, but alternatively, they may be positioned above and below the upper and lower ends of the casing 13. What is important in positioning the magnets is to ensure that they create a magnetic field extending perpendicularly to the filter elements 12. In FIG. 5, an arrow 21 indicates a direction in which a fluid flows through the device, and an arrow 22 indicates a direction in which a magnetic field extends. It will be observed that the directions defined by the two arrows 21 and 22 are both substantially perpendicular to the filter elements 12. Numeral 23 denotes lines of magnetic force. The magnets may be disposed one above the other as mentioned before to create a magnetic field in a direction indicated by an arrow 22', whereby lines of magnetic force are at right angles to those shown in FIG. 5.

In operation, the magnets 20 are energized by application of a direct current to create a static magnetic field in a direction perpendicular to the filter elements 12, as shown at 22, for example. Lines 23 of magnetic force center on and in the vicinity of the filter elements 12. A fluid containing magnetic particles to be removed is introduced through the inlet conduit 15 and passed through the filter elements 12 in the direction of the arrow 21. The fluid, thus, flows across the magnetic field as illustrated in FIG. 5. Even extremely small magnetic particles are attracted by the filter elements 12 because of a very high density of magnetic force in the vicinity of the filter elements 12. The device provides a very high efficiency of magnetic separation because a multiplicity of filter elements 12 are positioned very uniformly. Despite their great number, the filter elements 12 present only very little resistance to the flow of the fluid because of their small volume occupancy relative to the whole volume of the casing 13. Thus, the fluid passing through the device of this invention shows only a very small pressure loss. In the embodiment being described, the casing 13 has a total filter area of 16 cm$^2$ and an overall length of filter area of 12 cm. The device has a magnetic separation capacity of approximately 10 liters per minute when the fluid is introduced at a velocity of 10 cm/sec.

A great number of magnetic particles may adhere to the filter elements 12 and reduce their magnetic attraction capacity after the device has treated large quantities of fluid. It is, therefore, necessary to regenerate the filter cells from time to time after the device is used to treat a predetermined quantity of fluid. For regeneration of the filter cells, introduction of the fluid to be treated is cut off and the magnets 20 are magnetized by application of an alternating current to gradually decrease the intensity of the magnetic field and thereby deenergize the filter elements 12. Then, a cleaning or washing fluid is introduced through the inlet conduit 15 and passed through the filter elements 12 to remove the magnetic particles collected on the filter elements 12. If the filter elements 12 are made of a material having only a small residual magnetic force, the magnetic particles are separated from the filter elements 12 and washed away by the washing fluid, only if the magnets 20 are deenergized or moved away from each other. In order to deenergize the magnets 20 or remove the magnetic field thereacross, it is sufficient to cut off the supply of an electric current to the coils if the magnets 20 are made of a material having only a small residual magnetic force.

Figure 6:
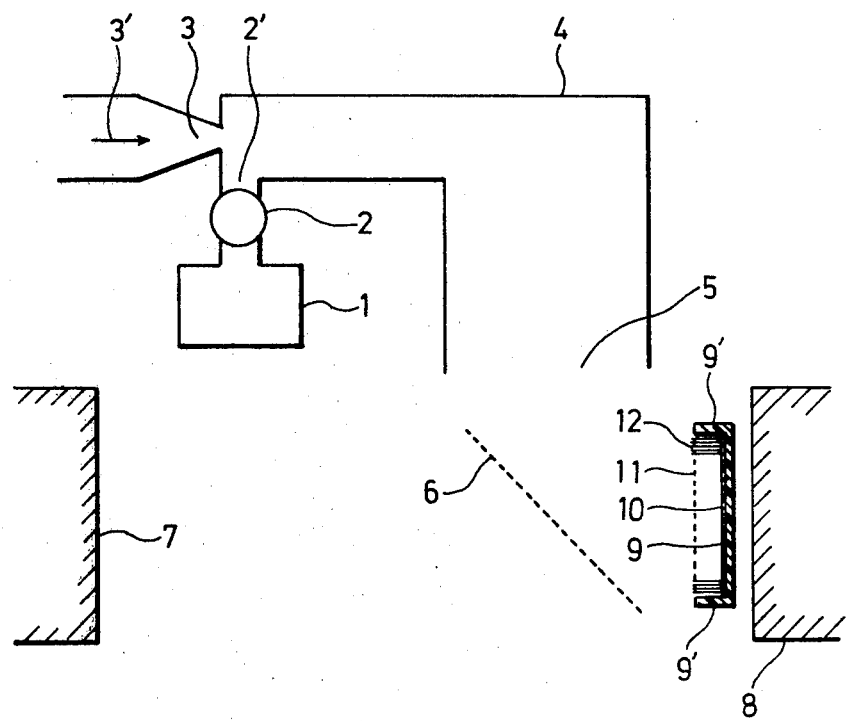
FIG. 6 is a diagrammatical illustration of the apparatus according to this invention.

Attention is now directed to FIG. 6 illustrating an example of apparatus embodying this invention. The apparatus includes a container 1 holding a multiplicity of fibrous filter elements 12. The container 1 has an opening 2' provided with a cock 2 adapted to open and close the opening 2'. A nozzle 3 is provided immediately above the opening 2' to deliver a jet or stream of compressed air in a direction indicated by an arrow 3', so that the compressed air may suck out filter elements 12 through the opening 2' while the cock 2 is open. To enhance the suction provided by the air stream from the nozzle 3, an air inlet port or ports not shown may be provided in the wall of the container 1, or alternatively, an air conduit also not shown may be provided to extend into the container 1 to introduce air thereinto. To this end, any other arrangements may be utilized if it is ensured that the filter elements are effectively taken out from the container 1 and carried forward on a jet or stream of air. A conduit 4 is connected at one end to the nozzle 3 and the opening 2' to receive the filter elements 12 ejected from the container 1 and eject them through its other end 5 which faces downward.

Located below the other or outlet end 5 of the conduit 4 is a wire netting 6 adapted to temporarily trap the filter elements 12 ejected through the outlet end 5. The wire netting 6 may, for example, be a 100-mesh net and is positioned at an angle of about 45° to the axis of the outlet end 5 of the conduit 4. The wire netting 6 temporarily holds the filter elements 12 falling thereon from the conduit 4, while the compressed air flows down through the wire netting 6. A pair of magnets 7 and 8 are provided with the wire netting 6 in between to create a magnetic field across the wire netting 6. One of the magnets, 8, is disposed closer to the wire netting 6 than the other magnet 7 is. It will be noted that the wire netting 6 may be omitted if the apparatus is controlled to provide a relatively slow jet of compressed air or create a strong magnetic force so that the filter elements 12 are magnetically attracted by and directed toward the magnet 8 across the air stream without the aid of the wire netting 6. The magnetic field is created between the magnets 7 and 8 to extend in a plane substantially perpendicular to the axis of the outlet end 5 of the conduit 4. The magnetic field is preferably controlled to provide a stronger magnetic force in the vicinity of the outlet end 5.

A filter cell is removably supported in front of the magnet 8 in the area in which a stronger magnetic force prevails. The filter cell is so positioned that its base plate 9 is vertical, while its side plates 9' are horizontal. The filter cell may be held in position by any appropriate positioning means of frame construction or otherwise as well known in the art.

In order to make a complete filter cell by using the apparatus described above, an appropriate adhesive 10 is applied to the inner surface of the base plate 9 and the base plate 9 is positioned as shown in FIG. 6. A jet of compressed air is supplied through the nozzle 3 in the direction of the arrow 3'. The cock 2 is opened and the air jet sucks out filter elements 12 from the container 1. The filter elements 12 are suitably scattered across the cross section of the conduit 4 as they pass through the conduit 4, and ejected through the outlet end 5 in a suitably scattered pattern. The filter elements 12 fall down onto the wire netting 6 and are temporarily held thereon in a properly spread pattern while the air flows down through the wire netting 6. The filter elements 12 are then magnetically attracted toward the magnet 8 shown on the right-hand side of FIG. 6 in which a stronger magnetic force prevails than in the vicinity of the other magnet 7. As the filter elements 12 leave the wire netting 6, the individual filter elements 12 are all directed to run in parallel to the magnetic field into the filter cell through the apertures of the wire netting 11 spread across the free edges of the side plates 9'. Those filter elements 12 which are perpendicular to the plane of the wire netting 11 readily pass the wire netting 11 and their leading ends are secured to the base plate 9 by the adhesive 10, while their trailing ends are retained slightly outwardly of the wire netting 11. Some filter elements may reach the wire netting 11 at an angle thereto instead of being perpendicular thereto, but upon contact with the wire netting 11, their positions are immediately corrected and those filter elements are directed toward the base plate 9 at right angles thereto. Because of their scattered arrangement over the wire netting 6 upon ejection through the outlet end 5 of the conduit 4, all the filter elements 12 are uniformly distributed throughout the filter cell when they adhere to the base plate 9. It will be understood in this connection that a further improved uniformity of distribution of filter elements throughout the filter cell may be obtained if the mutually facing surfaces of the wire netting 6 and the magnet 8 and the size of the conduit outlet end 5 are sufficiently large as compared with the size of the base plate 9. When the filter cell is filled with a predetermined quantity of filter elements 12 as determined by a predetermined degree of volume occupancy equal to, say, about 2% of the volume of the filter cell, the cock 2 is closed and the completed filter cell is removed from the apparatus. The adhesive 10 may still remain unsolidified, but the wire netting 11 properly holds the filter elements 12 in position and prevents them from getting out of order to an undesirable extent when the filter cell is moved within the magnetic field.

Although the invention has been described with reference to a preferred embodiment thereof, it is to be understood that further modifications or variations may be easily made by those skilled in the art without departing from the scope of the invention which is defined by the appended claims.

What is claimed is:

1. Apparatus for making a filter cell having a base and a plurality of fibrous filter elements secured to said base, comprising:
   (i) a container for holding a plurality of discrete fibrous filter elements in random orientation, said container having an opening,
   (ii) a feed conduit having a first end and a second end, and a lateral opening adjacent said first end, said container opening communicating with said lateral opening,
   (iii) means, for delivering a stream of compressed air, communicating with said first end of said conduit,
   (iv) a pair of spaced magnets for developing a magnetic field therebetween, said magnetic field having a zone in which there is a stronger magnetic force than in the remaining zone of the field, said magnets being disposed one at each side of said second end of said conduit, and
   (v) means for supporting said base in a position between said magnets and closer to one of said magnets than to the other of said magnets and transverse to the magnetic lines of force extending between said magnets.

2. Apparatus as in claim 1 further comprising means disposed adjacent to said second end of said conduit and between said magnets for temporarily holding said filter elements emerging from said second end of said conduit, said holding means permitting passage of air therethrough.

3. Apparatus as in claim 2 wherein said holding means comprises a planar netting positioned at an inclination to a central axis of said second end of said conduit such that filter elements temporarily held by said holding means may subsequently pass to said base.

* * * * *